United States Patent [19]

Harper

[11] 4,012,158
[45] Mar. 15, 1977

[54] ADJUSTABLE SEAT-BACK MECHANISM

[76] Inventor: Henry J. Harper, 720 Greentree Road, Pacific Palisades, Calif. 90272

[22] Filed: Sept. 15, 1975

[21] Appl. No.: 613,629

[52] U.S. Cl. .............................. 403/107; 248/408; 297/353; 403/325
[51] Int. Cl.² ...................... F16B 7/14; A47C 1/00
[58] Field of Search .......................... 297/296–301, 297/311, 353, 410; 248/407–409, 423, 188.2, 188.5, 157, 161; 292/267, 274, 278; 403/106, 107, 109, 322, 325, 350; 108/146

[56] References Cited

UNITED STATES PATENTS

| 848,001 | 3/1907 | Berninghaus | 297/410 X |
|---|---|---|---|
| 1,726,850 | 9/1929 | McComas | 292/274 |
| 3,309,050 | 3/1967 | Blink et al. | 108/146 X |
| 3,460,794 | 8/1969 | Colantti | 248/423 X |
| 3,854,772 | 12/1974 | Abrahamson et al. | 297/353 |

FOREIGN PATENTS OR APPLICATIONS

| 885,214 | 8/1953 | Germany | 292/267 |
|---|---|---|---|
| 270,408 | 7/1913 | Germany | 297/410 |
| 1,371,641 | 10/1974 | United Kingdom | 297/353 |

Primary Examiner—Ramon S. Britts
Assistant Examiner—William E. Lyddane
Attorney, Agent, or Firm—Harris, Kern, Wallen & Tinsley

[57] ABSTRACT

An adjustable seat-back mechanism for use with a secretarial chair or the like to allow vertical adjustment of the chair's seat back from among a series of discrete vertical locations. The mechanism includes a bracket attached to the seat back, a pivotal lever attached to the bracket and a mounting bar with edge notches that are engageable by the lever to define the discreet vertical locations. The lever is easily operated to allow quick and effortless movement of the seat-back.

1 Claim, 9 Drawing Figures

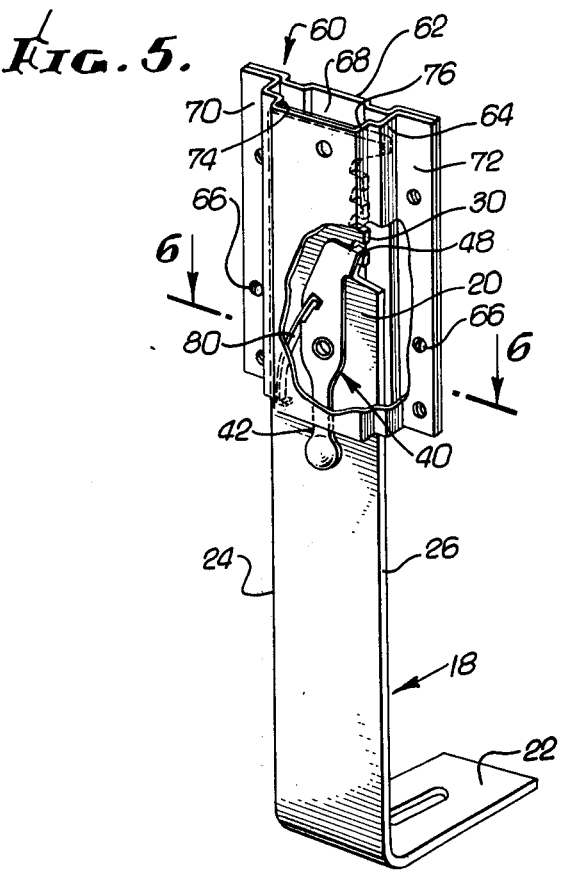
FIG. 5.
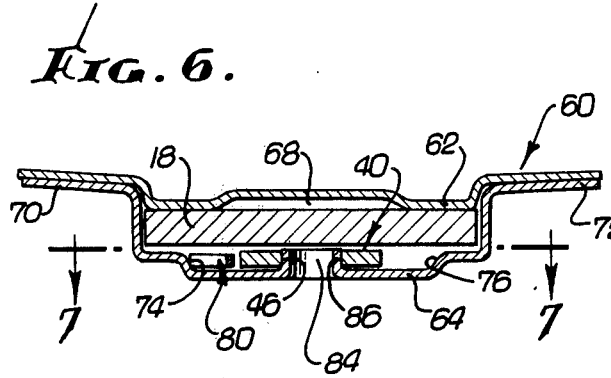
FIG. 6.
FIG. 9.
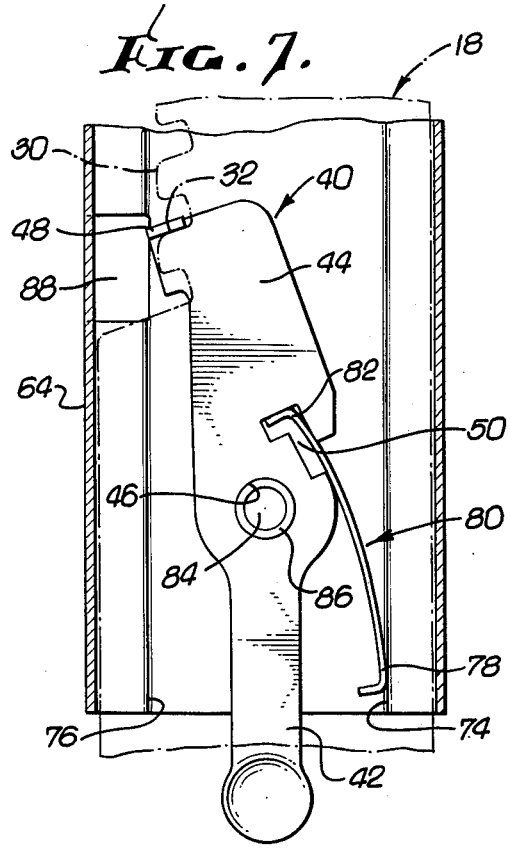
FIG. 7.
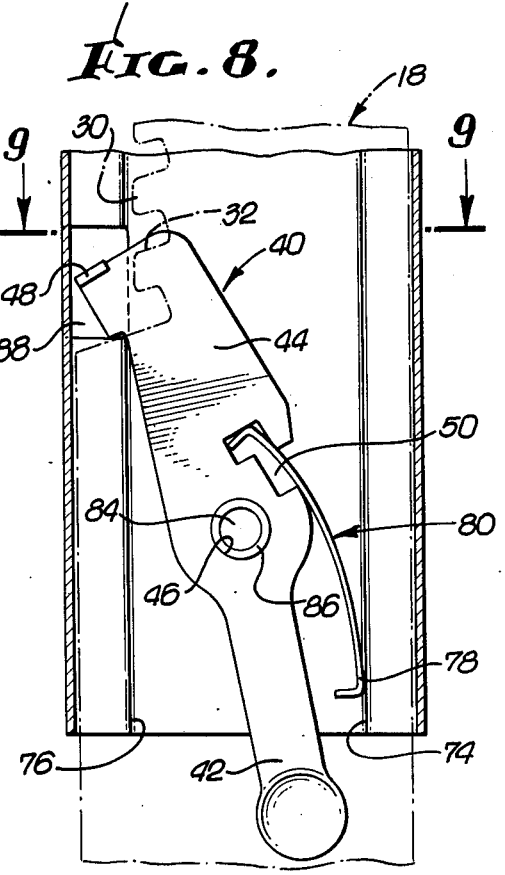
FIG. 8.

ADJUSTABLE SEAT-BACK MECHANISM

BACKGROUND OF THE INVENTION

1. Field of the Invention

The present invention relates to a chair seat-back mechanism and, more particularly, to an adjustable seat-back mechanism for secretarial chairs and the like for allowing facilitated vertical adjustment of the seat-back while at the same time providing a very reliable, simply-constructed mechanism which can be manufactured inexpensively.

2. Description of the Prior Art

The chairs with which the present invention is concerned are of the relatively simple type such as those used by secretaries and draftsmen, for example, and generally include a base or stand, a seat mounted to the base, a bar or tubular member attached to the seat or base and a seat-back fastened to the bar. Because of the varying sizes of the people who will use the chair, the seat-back is generally adjustable to allow for universal usage.

Many prior art chairs comprised a threaded handle which engaged the bar member to hold the seat-back in a particular position by a friction engagement between the handle and the bar member. While a great many chairs were and still are so constructed; there are major disadvantages, the most important of which is the difficulty in making adjustment. This is due to the excessive force necessary to secure the seat-back in a desired position. For example, most women cannot easily adjust their chairs because they physically are unable to provide sufficient torque to turn the handle. If sufficient torque is not used, then the seat will slip downwardly and refuse to stay in position.

An example of a more recent system which eliminates some of the earlier problems is shown in U.S. Pat. No. 3,295,888 in which the adjustment system includes a small steel ball that is moved between arcuate slots by a spring-operated positioning member. While the problem of insufficient torque appears solved, other problems still exist, including the complexity of such systems and the difficulty and expense of manufacture.

SUMMARY OF THE INVENTION

All of the above-mentioned problems in the prior art have been overcome by the present invention which provides an adjustable seat-back mechanism comprising a mounting bar for supporting a seat and a seat-back, the bar having means for defining discrete vertical locations; and a pivotal lever connected to the seat-back and engageable with the bar for adjustably retaining the seat-back in any of the discrete vertical locations desired.

It is a general aim of the present invention to provide an adjustable seat-back mechanism which is simply constructed, inexpensive and yet highly reliable for years of trouble-free operation.

Another aspect of the present invention is to provide an adjustable seat-back mechanism which may be easily operated to allow adjustment, requiring a minimum of physical strength on the part of the person doing the adjustment. This, of course, will be especially appreciated by women.

Another object of the present invention is to provide an adjustable seat-back mechanism which may be manufactured in a facilitated manner and easily assembled due to its having relatively few parts.

A corollary aspect of the present invention is to provide an adjustable seat-back mechanism which has a relatively narrow profile, so as to enhance esthetic appearance; the mechanism is especially suited to the newer, modern, streamlined designs presently in vogue for such items as secretarial chairs.

Other objects and advantages of the invention will appear from the following description taken in conjunction with the accompanying drawing.

BRIEF DESCRIPTION OF THE DRAWING

FIG. 5 is a rear perspective view of the adjustable seat-back mechanism partially broken away.

FIG. 6 is a sectional plan view taken along line 6—6 of FIG. 5.

FIGS. 7 and 8 are a front elevation view of a portion of the inventive adjustable seat-back mechanism illustrating the movement of the pivotal lever shown in FIG. 3.

FIG. 9 is a sectional plan view taken along line 9—9 of FIG. 8.

DESCRIPTION OF THE PREFERRED EMBODIMENT

Figure 1:
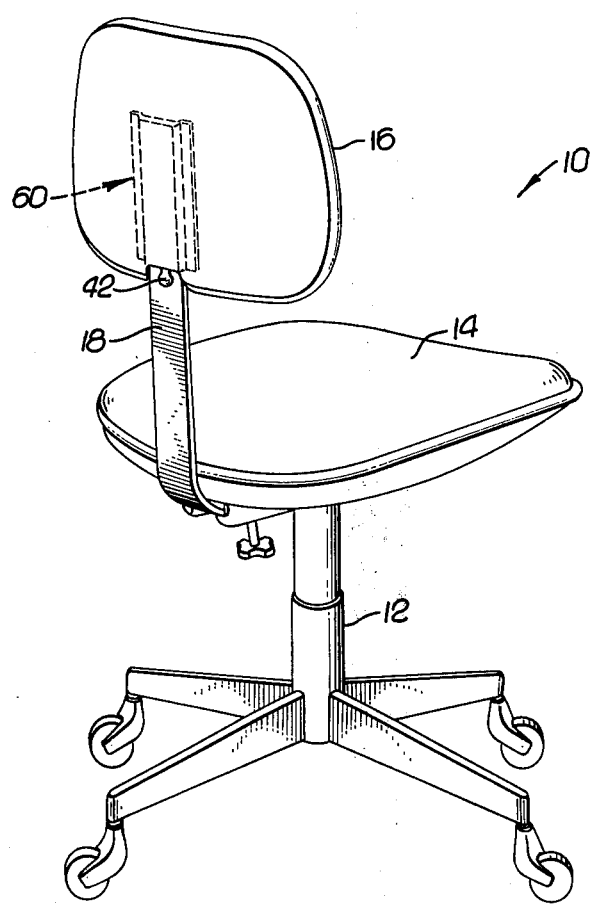
FIG. 1 is a rear perspective view of a modern secretarial chair which includes the inventive adjustable seat-back mechanism.

While the present invention is susceptible of various modifications and alternative constructions, an illustrative embodiment is shown in the drawing and will herein be described in detail. It should be understood however that it is not the intention to limit the invention to the particular form disclosed; but, on the contrary, the intention is to cover all modifications, equivalences and alternative constructions falling within the spirit and scope of the invention as expressed in the appended claims.

Referring now to FIG. 1, there is illustrated a modern secretarial chair 10 having a base 12, a seat 14 and a seat-back 16. Connecting the seat-back 16 and the seat 14 is a mounting bar 18. As already mentioned, in order to make the chair universally usable by people of different heights, the seat-back 16 is movable along the mounting bar to make it vertically adjustable relative to the seat 14.

Figure 2:
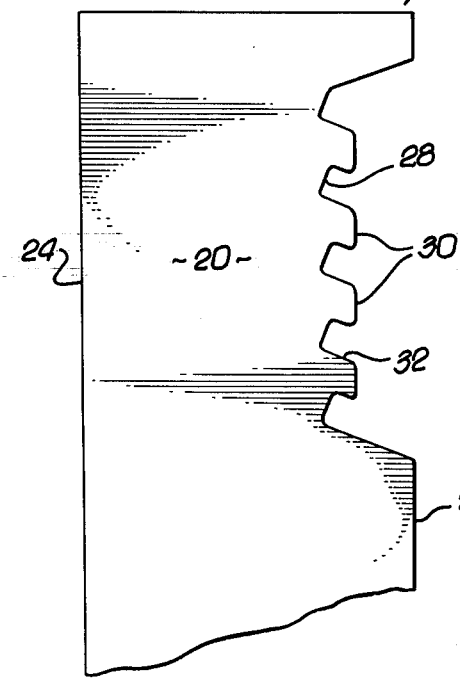
FIG. 2 is an enlarged perspective view of the mechanism's mounting bar.

It is an important aspect of the present invention that the adjustable seat-back mechanism is simply constructed and relatively inexpensive. Helping to achieve this is the structure of the mounting bar 18. Referring now to FIGS. 2 and 5, the mounting bar is illustrated having an upper vertical portion 20 and a lower generally horizontal portion 22. As can be seen by referring back to FIG. 1, the lower portion 22 is connected to the seat 14 and may also be connected to the base 12. The mounting bar may be made of steel strip stock which is bent to generally 90° as shown in FIG. 5. The bar has two longitudinal edges 24 and 26, and has machined or stamped in one of those edges, for example the edge 26 in FIG. 2, a plurality of discrete notches or grooves 28. In the embodiment shown in FIG. 2 the grooves form a series of projections 30. Each of the projections 30 include an upper abutment surface 32 to help vertically locate and restrain the seat-back as will be explained in more detail hereinbelow.

Figure 3:
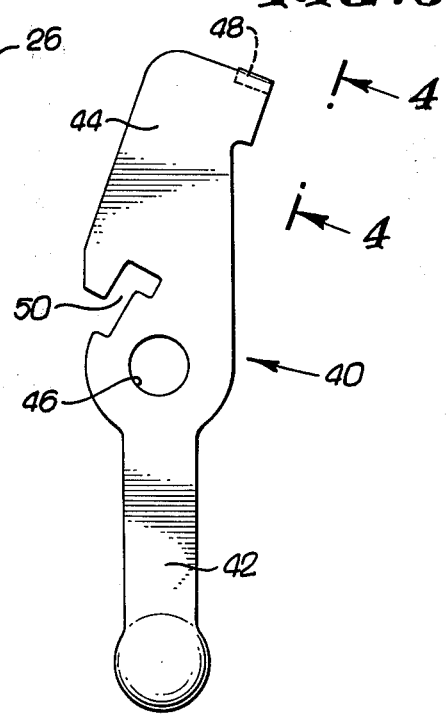
FIG. 3 is an enlarged elevation view of the pivotal lever to be used with the mounting bar shown in FIG. 2.
Figure 4:
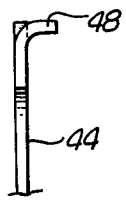
FIG. 4 is a side elevation view taken along line 4—4 of FIG. 3.

Cooperating with the bar to keep the adjustable seat-back mechanism structure simple and relatively inexpensive is a pivotal lever 40, FIG. 3. As with the bar, the lever 40 is conveniently formed of steel strip stock which may be punched or stamped into the form shown. The lever includes a lower handle portion 42, an upper body portion 44 and an opening 46. Near the top of the upper body portion 44 is a right angle arm 48 more clearly shown in FIG. 4. The opening 46 is for the purpose of receiving a hub about which the lever may be pivoted. The purpose of the arm 48 is to engage the abutment surfaces 32 of the mounting bar. Also formed in the lever is an inverted L-shaped recess 50 for receiving one end of a spring which will be described hereinbelow.

Another important aspect of the present invention is to have a relatively narrow profile so that the adjustment seat-back mechanism can be used in the modern, streamlined chairs currently being marketed. To help achieve this, the seat-back mechanism includes a sliding bracket 60 shown in FIGS. 5 and 6. The bracket, which is also made of steel strip stock stamped to the configuration shown, is made in two parts, a front part 62 and a rear part 64, which are conveniently attached one to the other by screws 66. It is to be noted that any other convenient fastening method such as tack welding could also be used. When the two parts 62 and 64 of the bracket 60 are attached, an opening 68 is formed for receiving the upper portion 20 of the mounting bar 18. Since the opening 68 is analogous to a tunnel, the bracket is able to slide vertically along the mounting bar to any desired location.

Each of the bracket parts includes longitudinally extending flanges such as the flanges 70 and 72 of the rear bracket part 64 and longitudinally extending shoulders such as shoulders 74 and 76 of the rear bracket part 64. The flanges 70 and 72 abut corresponding flanges on the front bracket part 62 which allow their connection by the screws 66. The shoulders 74 and 76 function to add strength to the bracket while the shoulders 74 as seen in FIGS. 5-8 also act to restrain one end 78 of a leaf spring 80 while the other end 82 of spring fits within the recess 50 of the lever 40. In addition the rear bracket part 64 includes an opening 84 as seen in FIG. 7 formed so as to leave an annular hub 86 upon which the lever 40 is mounted by having the opening 46 receive the hub 86. Thus, the lever 40 may be pivoted about the hub from a first position shown in FIG. 7 where it engages the mounting bar, to a second position shown in FIG. 8 where the lever is out of engagement with the mounting bar and thus allows vertical adjustability of the seat-back.

The leaf spring 80 acts to bias the lever to the first position in engagement with the mounting bar. The rear bracket part 64 also includes an opening 88 to allow clearance for the lever when the lever is in the second fully disengaged position.

What has just been described is a simply constructed and easily assembled adjustable seat-back mechanism. This mechanism is very reliable in operation since there is very little wear associated with usage and the mechanism is comprised of only five parts.

In operation, the sidable bracket 60 is attached to the internal portion of the seat-back to allow full design freedom for the esthetic appearance of the chair. Nevertheless, the bracket receives the mounting bar and is easily vertically movable or slidable relative to the mounting bar. As mentioned, the lever is pivotal between two positions, an engagement position as shown in FIG. 7 in which the arm 48 of the lever engages one of the abutment surfaces 32 of the mounting bar and thereby locates and retains the seat-back in a desired position. However, should it be desired to alter the seat-back's position, an operator need merely grasp the handle portion 42 of the lever and rotate it slightly, to the left as seen in FIG. 5 and to the right as viewed in FIGS. 7 and 8, to cause disengagement of the seat-back from the mounting bar. This allows the seat-back to be vertically moved to another position. Once the new position has been reached the operator merely releases the handle. The leaf spring 80 then biases the lever back to its first or engagement position.

It can be appreciated that the mechaism is very easily operated and requires very little physical effort. The abutment between the arm 48 and one of the abutment surfaces 32 assures a locking engagement; the leaf spring provides a constant locking force to retain the locking engagement and thus assures against slippage by the seat-back. The major problems in the prior art are overcome by virtue of the positive engagement of the mechanism and by its exceedingly easy manner of operation.

What is claimed is:

1. In an adjustable seat-back mechanism, the combination of:
   a. an upright, flat mounting bar having horizontally spaced first and second upright edges;
   b. said first edge of said mounting bar having vertically spaced teeth therein;
   c. a tubular bracket on and movable vertically of said mounting bar and having horizontally spaced first and second, upright edges respectively adjacent said first and second edges of said mounting bar;
   d. said first edge of said bracket having an opening therein adapted to register with said teeth on said first edge of said mounting bar;
   e. a lever within said bracket and adjacent said mounting bar and having upper and lower ends and pivotally connected to an inner surface of said bracket intermediate the upper and lower ends of said lever;
   f. said lever having at its upper end an element selectively engageable either with one of said teeth on said first edge of said mounting bar, or insertable into said opening in said first edge of said bracket to disengage said teeth;
   g. a leaf spring for biasing said element into selected engagement with said teeth on said first edge of said mounting bar;
   h. said lever having an inverted L-shaped recess therein receiving an upper end of said leaf spring and connecting said upper end of said leaf spring to said lever;
   i. the lower end of said leaf spring being seated against said second edge of said bracket; and
   j. said lower end of said lever depending below the lower end of said bracket.

* * * * *